United States Patent
Imhof

(10) Patent No.: US 7,108,136 B2
(45) Date of Patent: Sep. 19, 2006

(54) PNEUMATIC FLOTATION SEPARATION DEVICE

(76) Inventor: Rainer Imhof, Leharweg 23, 46262 Dorsten (DE)

( * ) Notice: Subject to any disclaimer, the term of this patent is extended or adjusted under 35 U.S.C. 154(b) by 0 days.

(21) Appl. No.: 10/472,082

(22) PCT Filed: Mar. 19, 2001

(86) PCT No.: PCT/GB01/01191

§ 371 (c)(1),
(2), (4) Date: Jan. 30, 2004

(87) PCT Pub. No.: WO02/074440

PCT Pub. Date: Sep. 26, 2002

(65) Prior Publication Data

US 2004/0112804 A1   Jun. 17, 2004

(51) Int. Cl.
*B03D 1/24* (2006.01)
*B04C 5/04* (2006.01)
*B04C 5/10* (2006.01)
*B04C 5/181* (2006.01)

(52) U.S. Cl. ............... 209/170; 209/730; 209/732; 209/733; 209/734

(58) Field of Classification Search .............. 209/170, 209/730, 732, 733, 734; 210/221.2, 512.1
See application file for complete search history.

(56) References Cited

U.S. PATENT DOCUMENTS

| | | | |
|---|---|---|---|
| 4,399,028 A | * 8/1983 | Kile et al. ................. 209/164 |
| 4,560,474 A | * 12/1985 | Holik ........................ 210/221.2 |
| 5,022,984 A | * 6/1991 | Pimley et al. .............. 209/170 |
| 5,207,920 A | * 5/1993 | Jones ......................... 210/703 |
| 5,651,879 A | 7/1997 | Gonzalez |

FOREIGN PATENT DOCUMENTS

| | | | |
|---|---|---|---|
| CA | 2120436 | * | 10/1994 |
| DE | 2727398 | * | 1/1979 |
| DE | 3417327 | * | 10/1985 |
| DK | DE 2738782 B | | 11/1987 |
| EP | 198737 | * | 11/1988 |
| EP | 0888819 A | | 1/1999 |
| EP | 1084753 A | | 3/2001 |
| FR | 86129 E | | 3/1966 |
| FR | 2584947 A | | 1/1987 |
| GB | 2102308 | * | 2/1983 |
| GB | 2162092 | * | 1/1986 |
| GB | 2246306 | * | 1/1992 |

* cited by examiner

*Primary Examiner*—Thomas M. Lithgow
(74) *Attorney, Agent, or Firm*—John M. Naber; Dickinson Wright PLLC

(57) ABSTRACT

A separating device (10) especially for use in a pneumatic flotation system comprises an annular channel (18), at least one nozzle (16) for introducing aerated pulp substantially horizontally and tangentially into the annular channel (18), froth extraction means (26) for the removal of separated froth from the annular channel (18), and pulp extraction means (24) for the removal of separated pulp from the annular channel (18), the at least one nozzle (16) being configured so that the aerated pulp introduced into the annular channel (18) rotates therein with centrifugal forces of between 5 and 20 ms$^{-2}$.

11 Claims, 3 Drawing Sheets

PNEUMATIC FLOTATION SEPARATION DEVICE

The present invention relates to a separation device for use in a pneumatic flotation system, especially but not exclusively, for the separation of slurry.

Slurry comprises a fluid with particles suspended therein, which together form a pulp which is rich in valuable minerals. It is desirable to extract the minerals from the pulp, and this is typically done by a flotation technique in which air bubbles, which retain the minerals, are created in the pulp and then separated from it.

A previously proposed method of separation uses mechanical agitation. The pulp is contained in a cascade of tanks, and agitated with impellers and stators, which maintains particle suspension in the pulp, and introduces air. The air is then dispersed with blowers or by self-aspiration into the impeller mechanism.

An alternative method is that of column flotation, in which pulp is introduced into the top of a vertical cylindrical vessel, and a stream of bubbles is produced at the bottom of the vessel, and flows upwardly through the down-flowing pulp.

A more efficient method is that of pneumatic flotation, in which bubbles are dispersed through the pulp by aeration means prior to the introduction of the pulp to a separating device. Such devices include the Jameson Cell and the Bahr Cell. Aerated pulp is introduced into cylindrical or conical tanks, and the flow movement creates some separation of the bubbles in the form of a froth, which then flows to a peripheral launder. The aerated pulp is introduced typically 2 metres below the surface of the pulp already held in the tank, which is likely to have a diameter of at least 3 metres.

Additionally, the aerated pulp may be introduced into a cylindrical tank in a tangential and horizontal orientation, to create a rotary movement of the pulp, with centrifugal forces generally less than 1 ms$^{-2}$. The amount of time which the pulp is retained in the tank is typically between 2.5 and 3.5 minutes. This duration is required so that low flow rates of the pulp occur, which allows smaller air bubbles, which have relatively low buoyancy, sufficient time to make their way to the froth on the surface of the pulp. Thus the separation process is relatively slow, and the quality of the separation can be less than ideal.

An aim of the present invention is to address one or more of the foregoing disadvantages.

Accordingly the present invention is directed to a separating device especially for use in a pneumatic flotation system comprising an annular channel, at least one nozzle capable of introducing aerated pulp, with pre-established speed, substantially horizontally and tangentially into the annular channel, froth extraction means for the removal of separated froth from the annular channel, and pulp extraction means for the removal of separated pulp from the annular channel, in which the at least one nozzle is configured so that the aerated pulp introduced into the annular channel rotates therein with centrifugal forces of between 5 and 20 ms$^{-2}$. These large forces act in conjunction with gravitational forces to rapidly and efficiently separate mineral-carrying air bubbles from the fluid and non-floating particulate matter of the pulp, to create a improved quality of mineralised froth.

Advantageously the at least one nozzle introduces the aerated pulp to the annular channel at a level close to below the desired surface level of the pulp in the annular channel. In this way, the separated pulp, which moves downward under the centrifugal and gravitational forces, is removed from the path of newly introduced aerated pulp.

In a preferred embodiment on average the time spent by the aerated pulp in the separating device is less than 30 seconds. Less time is hence taken to separate a given volume of aerated pulp. This is made possible by the high centrifugal forces, which increase the velocities of the bubbles and particulate matter so that they separate from each other more quickly.

Advantageously the froth extraction means comprises a froth overflow weir positioned near the inside upper edge of the annular channel. The gravitational and centrifugal forces create a movement of the bubbles towards the surface of the aerated pulp to form a froth, which is then simply extracted from the annular channel by overflowing.

Preferably the froth extraction means further comprises a pipe fed by the froth overflow weir. The overflowing froth is thus collected and piped away from the separator device.

In a preferred embodiment the pulp extraction means are positioned near the base of the annular channel. The means are therefore in the vicinity of the separated pulp.

Preferably the pulp extraction means comprises a pulp overflow weir and a plurality of apertures in the annular channel positioned below the top of the pulp overflow weir. This construction allows for a small volume of separated pulp to leave the annular channel before the majority of the aerated pulp passes over the overflow weir. In this way it is possible to maintain a near-constant height of pulp within the annular channel, to compensate for any variations in the rate of aerated pulp introduction.

Advantageously the pulp extraction means further comprises a tailings pipe fed by the pulp overflow weir and the apertures. The separated pulp extracted via the apertures and via the pulp overflow weir is thereby combined after extraction within a single pipe to be discharged from the separating device.

Preferably the separating device further comprises a manifold which distributes the aerated pulp to the at least one nozzle. The manifold can evenly distribute the aerated pulp between a number of nozzles, and control the rate of flow at which the aerated pulp is introduced to the annular channel.

In a preferred embodiment the separating device further comprises an aeration device which supplies the aerated pulp to the manifold.

An example of a separating device made in accordance with the present invention will now be described with reference to the accompanying drawings, in which.

Figure 1:
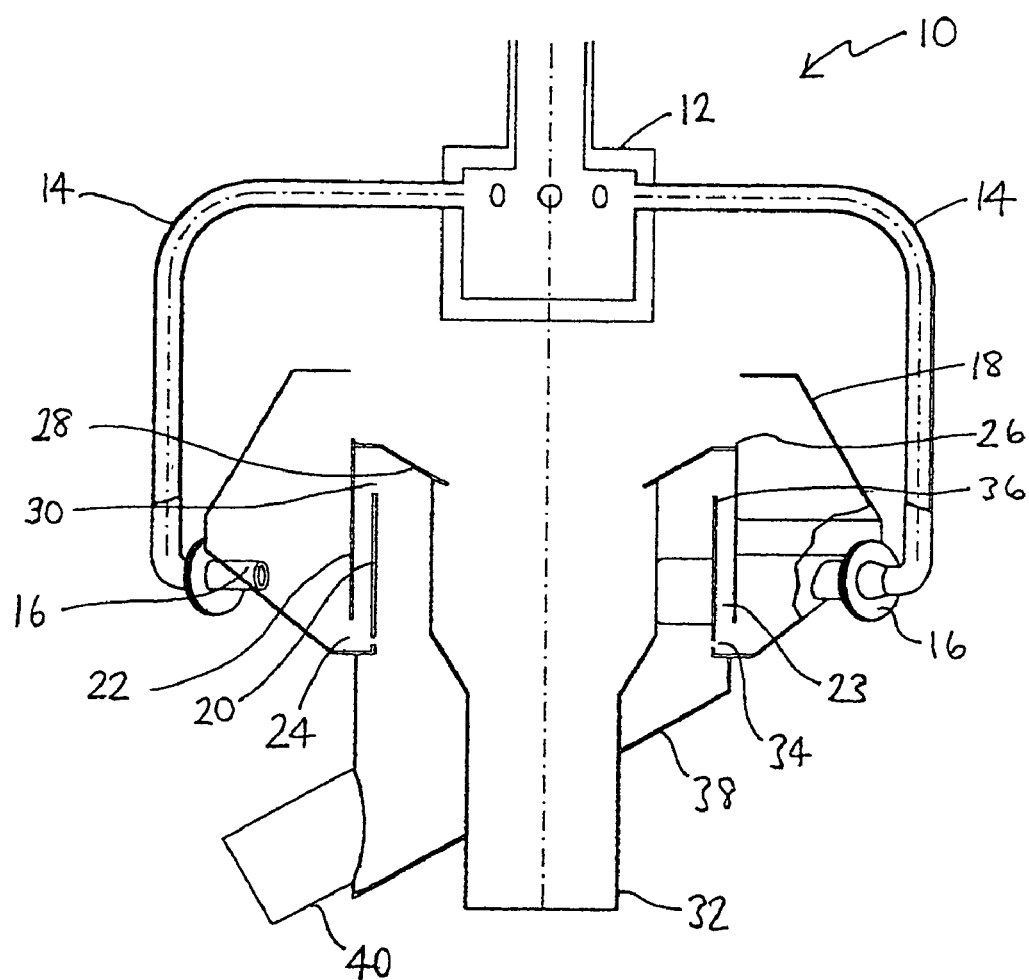
FIG. 1 shows a cross-section of such a separating device.

FIG. 1 shows a separating device 10. A manifold 12 has a plurality of pipes 14 leading from it, which each terminate in a nozzle 16. An annular channel 18 is positioned in a horizontal plane below the manifold. The annular channel 18 has diameter to height ratio of greater than three. The pipes 14 connect to the interior of the annular channel 18 via the nozzles 16, so that the nozzles 16 lead into the annular channel 18 in horizontal and tangential positions. The annular channel has a double internal wall, comprising an outer wall 20 and an inner wall 22. An opening 24 is provided at the base of the inner wall 22 so that the interior of the annular channel 18 extends to the outer wall 20. The inner wall 22 and the outer wall 20 define a vertical cylindrical passage 23.

The inner wall 20 extends in height above the height of the outer wall 20. The top edge of the inner wall 20 forms a froth overflow weir 26. Funnel means 28 extend from the weir 26 towards the central axis of the annular channel 18, passing over the top of the outer wall 20, sloping downwards, and defining a gap 30 between the top of the outer wall 20 and the underside of the funnel means 28. A vertical pipe 32 is positioned below the funnel means 28, and coaxial with the annular channel 18. The upper edge of the pipe 32 contacts the underside of the funnel means 28.

A plurality of apertures 34 are provided near the base of the outer wall 20, and spaced apart around its circumference. The top of the outer wall 20 forms a pulp overflow weir 36.

A tailings pipe 38 is disposed between the outer wall 20 and the pipe 32 so that it encompasses the pipe 32, and tapers at its lower end to form an outlet 40 spaced apart from the lower end of the pipe 32. The interior of the tailings pipe connects with the interior of the annular channel via the apertures 34 and the gap 30.

Figure 2:
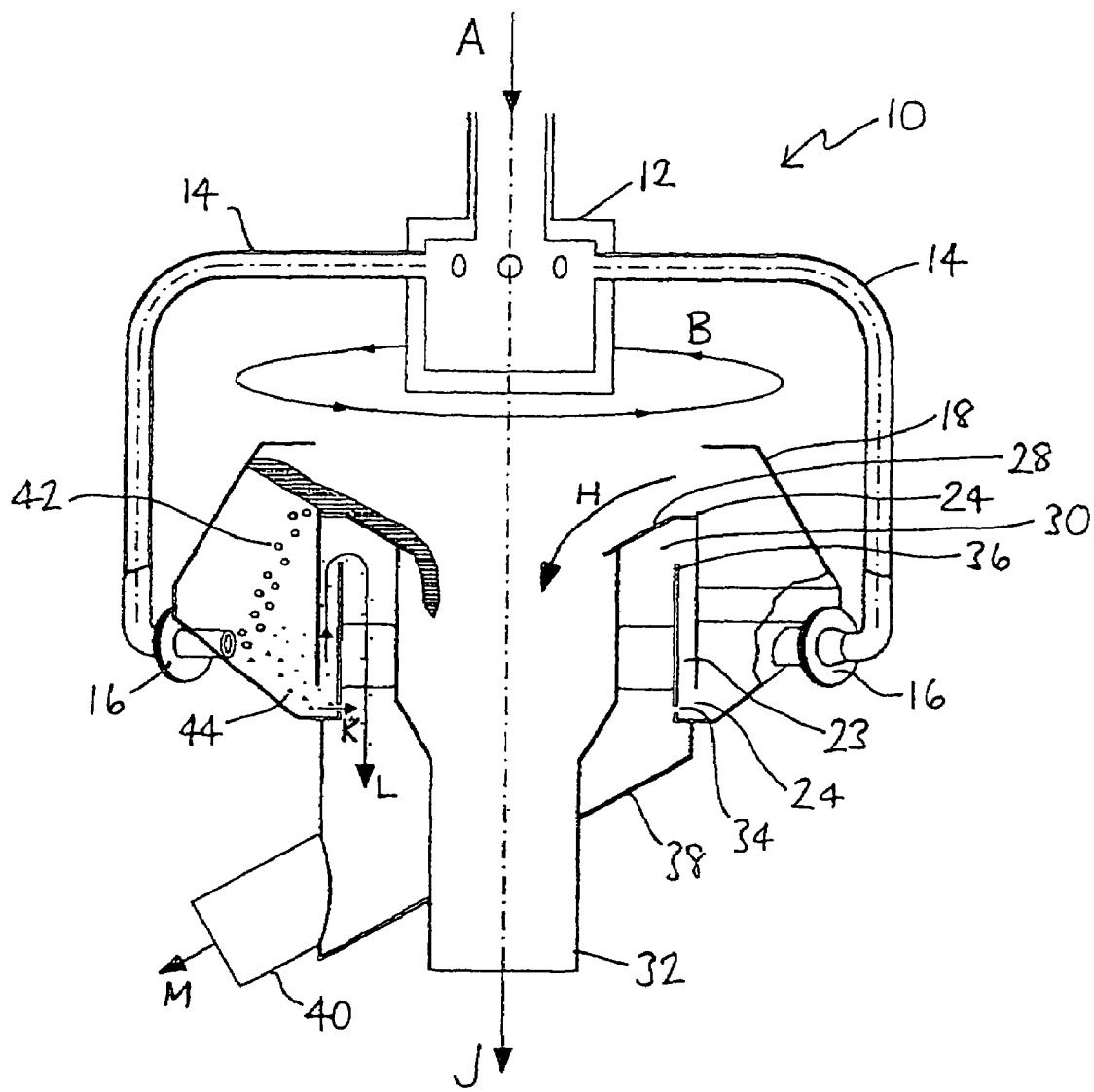
FIG. 2 shows a cross-section of the separating device in use.

FIG. 2 shows the separating device in use The arrows indicate the flow of the pulp at various stages of the separation process.

Slurry pulp which is to be separated comprises non-floating particles suspended in fluid, and contains valuable minerals. The pulp is aerated in an aeration device (not shown) so that it contains many air bubbles, which carry the minerals. The aerated pulp passes into the manifold 12, as indicated by arrow A. The manifold 12 distributes the aerated pulp between the pipes 14 so that the pulp flows along the pipes 14 at velocity. On reaching the nozzles 16, the aerated pulp is introduced horizontally and tangentially into the annular channel 18. The direction and velocity of introduction cause the aerated pulp to circulate around the annular channel as indicated by arrow B. The circulation velocity is determined by the size, number and configuration of the nozzles 16, and the velocity at which the aerated pulp leaves the nozzles 16. The nozzles 16 are situated just below the surface of the circulating pulp.

Figure 3:
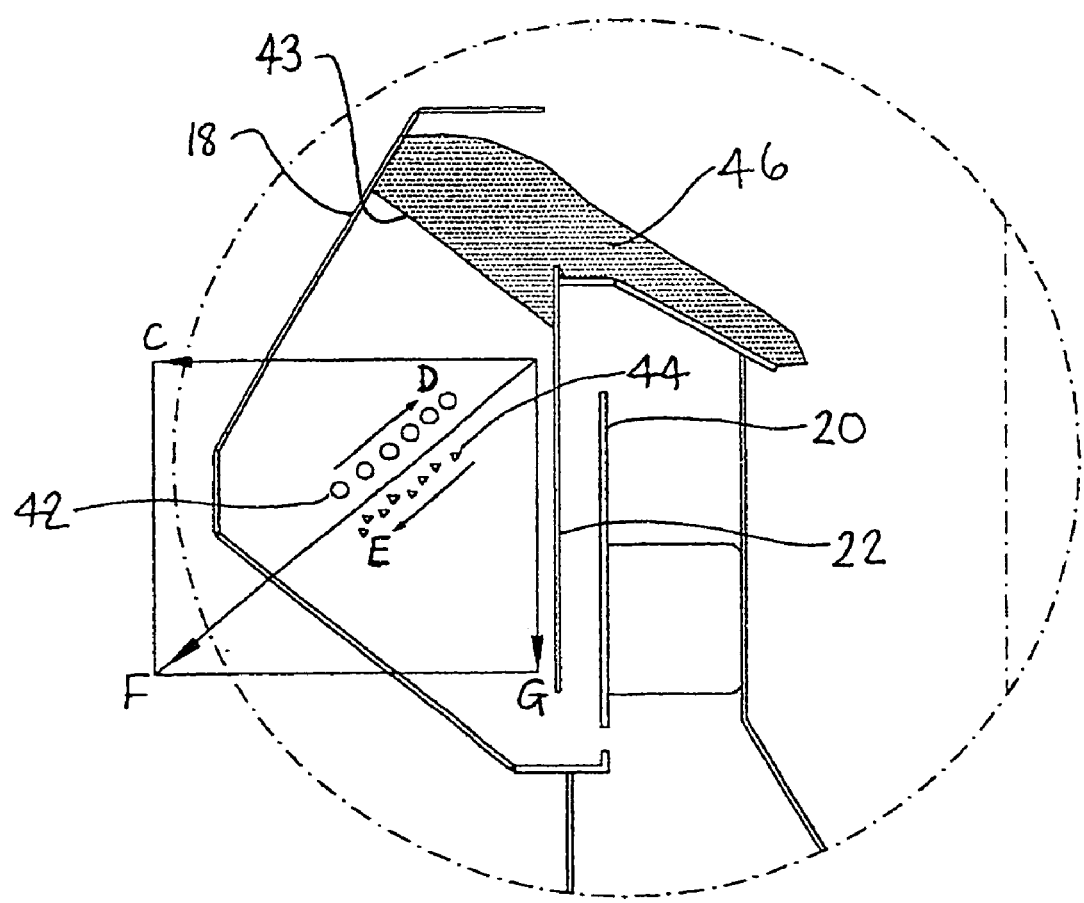
FIG. 3 shows a schematic cross-section of an annular channel of the separating device in use.

Once circulating, the aerated pulp has two forces acting upon it. These are the gravitational force acting downwards and a centrifugal force acting radially outwards, perpendicular to the axis of rotation. The centrifugal force is between 5 and 20 ms$^{-2}$. The resultant force arising from the gravitational and centrifugal forces acts downwardly and outwardly. The direction of the forces is shown schematically in FIG. 3, where arrow C shows the centrifugal force, arrow G shows the gravitational force, and arrow F shows the resultant force.

The resultant force acts to separate the aerated pulp. The bubbles 42, which carry the minerals contained in the slurry, rise upwards against the direction of the resultant force, as indicated by arrow D. They rise to the surface 43 of the circulating pulp, in the vicinity of the froth overflow weir 26. The bubbles 42 combine to form a mineral-containing froth 46, which under gravity flows over the froth overflow weir 26, down the funnel means 28 and into the pipe 32, as indicated by arrow H. The froth leaves the pipe as indicated by arrow J.

The resultant force acts on the non-floating particles 44 to carry them in the opposite direction to the movement of the bubbles 42, so that they settle in the lower part of the annular channel 18, forming a separated pulp. Continuing separation creates a build-up of separated pulp, which flows through the opening 24 into the passage 23. A small portion of the separated pulp comprising predominantly coarse particles, passes through the apertures 34 (arrow K). The remainder of the separated pulp is forced up the passage 23 by the weight of the newly formed separated pulp behind it, and flows over the pulp overflow weir 36 (arrow L). The two thus-formed flows of separated pulp recombine in the tailings pipe 38 to form tailings, which are discharged through the outlet 40 (arrow M).

The size of the apertures 34 is determined so that only a small amount of the separated pulp passes through, with the remainder being forced over the pulp overflow weir 36. This arrangement acts to regulate the rate at which the separated pulp leaves the annular channel 18, so that a roughly constant depth of pulp is maintained within the annular channel 18. This compensates for any variations in the flow rate from the nozzles 16 of the incoming aerated pulp.

The position of the nozzles 16 means that the aerated pulp is introduced into the annular channel 18 just below the level of the circulating pulp. This means that the incoming flow does not disturb the previously separated pulp, which has settled to the bottom of the annular channel 18.

The relatively high centrifugal force, 5 to 20 ms$^{-2}$, creates a resultant force of sufficient magnitude to act to separate the aerated pulp very efficiently Even relatively small hydrophilic particles are rapidly carried downwards and thus prevented from reaching the vicinity of the froth overflow weir 26. The chance of hydrophilic, non-valuable particles becoming entrapped in the froth is thus reduced so that the quality of the froth is very good, containing only small amounts of misplaced particles.

This rapid and efficient separation process is also highly advantageous as regards the speed of separation. The high resultant force created acts to separate the bubbles and particles sufficiently quickly that any given volume of aerated pulp spends typically less than 30 seconds in the separating device. This is typically one-sixth of the time required in previously proposed pneumatic flotation separation devices.

What is claimed is:

1. A separating device especially for use in a pneumatic flotation system comprising:
    an annular channel,
    at least one nozzle capable of introducing aerated pulp, with pre-established speed, substantially horizontally and tangentially into the annular channel,
    froth extraction means for the removal of separated froth from the annular channel, and
    pulp extraction means for the removal of separated pulp from the annular channel,
    wherein the at least one nozzle is configured so that the aerated pulp introduced into the annular channel rotates therein with centrifugal forces of between 5 and 20 ms$^{-2}$,
    wherein the pulp extraction means comprises a pulp overflow weir and a plurality of apertures in the annular channel positioned below a top of the pulp overflow weir.

2. The separating device according to claim 1, wherein the at least one nozzle introduces the aerated pulp to the annular channel at a level close below a desired surface level of the pulp in the annular channel.

3. The separating device according to claim 1, wherein on average, a time spent by the aerated pulp in the separating device is less than 30 seconds.

4. The separating device according to claim 1, wherein the froth extraction means comprises a froth overflow weir positioned near an inside upper edge of the annular channel.

5. The separating device according to claim 1, wherein the froth extraction means further comprises a pipe fed by the froth overflow weir.

6. The separating device according to claim 1, wherein the pulp extraction means are positioned near a base of the annular channel.

7. The separating device according to claim 1, wherein the pulp extraction means further comprises a tailings pipe fed by the pulp overflow weir and the apertures.

8. The separating device according to claim 1, further comprising a manifold which distributes the aerated pulp to the at least one nozzle.

9. The separating device according to claim 8, further comprising an aeration device which supplies the aerated pulp to the manifold.

10. A separating device especially for use in a pneumatic flotation system comprising:
   an annular channel,
   at least one nozzle capable of introducing aerated pulp, with pre-established speed, substantially horizontally and tangentially into the annular channel,
   a froth overflow weir disposed in the annular channel, such that froth from said aerated pulp will be extracted and removed from the annular channel via a first pipe;
   a vertical cylindrical passage disposed adjacent to said annular channel, said vertical cylindrical passage which receives pulp separated from said annular channel for eventual removal via a second pipe; and
   a plurality of apertures in said annular channel, through which a portion of said pulp passes to be removed from the system via said vertical cylindrical passage.

11. A separating device especially for use in a pneumatic flotation system comprising:
   an annular channel;
   at least one nozzle capable of introducing aerated pulp, with pre-established speed, substantially horizontally and tangentially into the annular channel;
   froth extraction means for the removal of separated froth from the annular channel; and
   pulp extraction means for the removal of separated pulp from the annular channel;
   wherein the at least one nozzle is configured so that the aerated pulp introduced into the annular channel rotates therein with centrifugal forces of between 5–20 $ms^{-2}$, wherein said pulp extraction means comprises a vertical cylindrical passage disposed adjacent to said annular channel, said vertical cylindrical passage which receives pulp separated from said annular chamber for eventual removal via a second pipe and a plurality of apertures in said annular channel, through which a portion of said pulp passes to be removed from the system via said vertical cylindrical passage.

* * * * *